June 13, 1967
R. H. L. BAHOUT
3,325,155
VALVE TRAY APPARATUS
Filed April 30, 1963
3 Sheets-Sheet 1
FIG. 1.
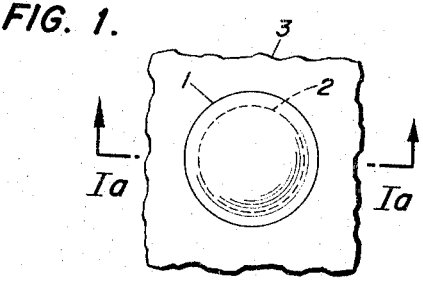
FIG. 2.
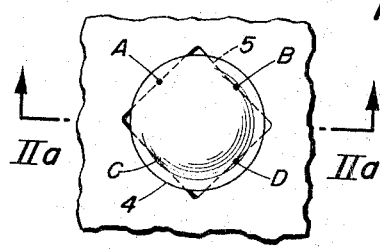
FIG. 1a.
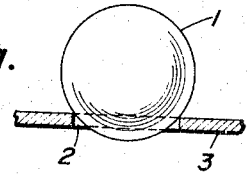
FIG. 2a.
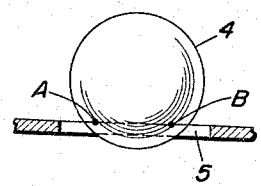
FIG. 3a.
FIG. 3b.
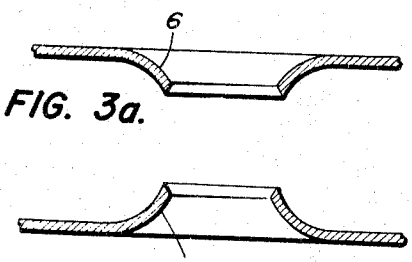
FIG. 4.
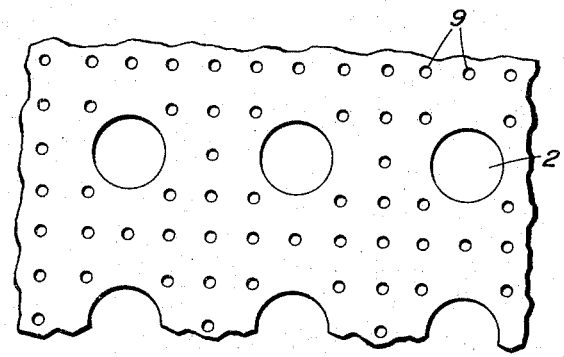
FIG. 5.
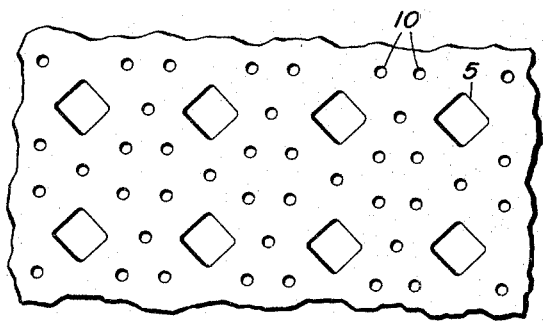
FIG. 6.
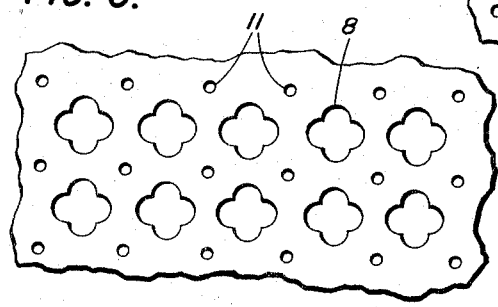
INVENTOR
René H. L. Bahout
BY Stevens, Davis, Miller & Mosher
ATTORNEYS June 13, 1967  R. H. L. BAHOUT  3,325,155
VALVE TRAY APPARATUS Filed April 30, 1963  3 Sheets-Sheet 3

René H. L. Bahout
INVENTOR

BY Stevens, Davis, Miller & Mosher
ATTORNEYS 3,325,155
VALVE TRAY APPARATUS
Rene H. L. Bahout, Argenteuil, Seine-et-Oise, France, assignor to Societe pour l'Equipment des Industries Chimiques—S.P.E.I. Chim.—Réunion des Anciens Etablissements Barbet, Egrot & Grangé, Pingris & Mollet-Fontaine, Paris, France, a company of France
Filed Apr. 30, 1963, Ser. No. 276,781
Claims priority, application France, May 7, 1962, 896,735
1 Claim. (Cl. 261—113)

The present invention relates to apparatus for bringing different phases into contact, more particularly for distillation or absorption columns.

It is known that a perforated distillation or absorption tray provides a most efficient apparatus for bringing two phases, liquid and gas (or vapour), into contact with one another. The gaseous phase is in a very finely divided form, and since the gases follow a purely vertical path of travel, the pressure loss is reduced to a minimum.

Unfortunately, a perforated tray lacks flexibility; at low rates of flow of the gaseous phase, the liquid is not maintained on the tray and passes through some of the perforations. This results in very poor efficiency.

The object of the present invention is to obviate this disadvantage by automatically closing some of the perforations at low rates of flow of the vapour or gas.

According to the present invention, there is provided a tray for apparatus for improving the contact between two phases of different densities, particularly a liquid and a vapour or a gas, such tray having passages therein for the ascent of the lighter phase and balls, each of which is adapted to close at least partly one of the passages in the absence of an ascending flow and at the lowest rates of said flow, but to be lifted to release this passage at higher rates of flow.

The improved trays according to the present invention can have two kinds of perforations for the passage of the vaporous or gaseous phase and comprise the usual means for the descent of the liquid; it will be convenient to refer to the perforations which are always open to the gaseous flow as orifices and to refer to those which can be closed at certain rates of flow as passages.

These balls may be made of any suitable material which is resistant to corrosion, for example glass, ceramic material, plastic material, metal, etc., the only condition being that its specific gravity should be several times greater than that of the liquid to be treated.

It is recommended that the balls should not be too large. In fact, their weight increases as the cube of the radius and the surface bearing on the corresponding passage increases only with the square of the radius. Therefore, the necessary pressure for lifting the ball is proportional to its radius. Obtaining a low pressure loss makes it desirable to use balls having a diameter less than 16 mm., if they are made of glass or ceramic material, and hollow spheres if metals other than light metals are used.

It is also advantageous not to have balls of too small a size, since the multiplication of their number and the difficulty of positioning them increases costs.

The present invention is particularly applicable to glass or ceramic balls which are capable of withstanding thermal and mechanical shocks and have a diameter of between 10 and 16 mm., a diameter of about 14 mm. being recommended.

The passages may be circular in form and may be completely closable by the ball in the condition of rest. In another form, they may have a non-circular form, for example elliptical, triangular, square, hexagonal, oval, etc., so that they cannot be totally closed by the ball in the condition of rest and can leave a fraction of their total surface always open for the passage of the gaseous phase.

The passages are preferably uniformly distributed over the useful surface of the tray. They may be in the form of a convergent or divergent nozzle. Although this is not necessary, they may be combined with orifices which are also uniformly distributed. The cross-section of each orifice should be small in order to avoid the liquid passing counter-current to the gas. This condition is obtained when the cross section of the orifice is less than 1 cm.$^2$ approximately. The most favourable dimensions are between 3 and 6 mm. in diameter for the circular orifices.

The orifices may be of any desired form (circular, regularly polygonal, or irregularly polygonal) but the simplest form of course is the circular form. In sectional view, they may if necessary have the form of a convergent or divergent nozzle.

The operation of the tray is controlled by the relationships between the four following areas:

(1) The total area of the orifices which are always open;

(2) The total area of the portion of the passages which is not closed by the balls in the condition of rest;

(3) The total area of the portion of the passages which is closed by the balls in the condition of rest;

(4) The surface area of the portion of the tray provided with orifices and passages.

The sum of the two first should always be in a ratio of about 5% relative to the fourth, to ensure that the tray is not emptied at low gaseous flow rates.

The proportion of the third surface relative to the fourth can be 10 to 30% the best ratio being about 20%.

According to a further feature of the invention, a wire grid of adequate rigidity is used as guiding and/or travel limiting means. The wire can be made of metal or plastic material or a combination of both, or of glass fibre, depending on the use to which the apparatus is being put. The wire grid is generally made with square or hexagonal meshes.

The travel of the balls should be such that the cross-section presented to the vapour between the ball in the raised position and the periphery of the passage should be of the same order as that of the passage itself. This requirement is met for travels of about 20 to 30% of the diameter of the ball, for the most favourable ratios between ball diameter and passage size.

Under these conditions, the grid serving to limit travel is placed at a distance from the tray which is less than the diameter of the balls. Hence the wires constituting the cloth or grid prevent lateral displacement of each ball out of a mesh allocated to that paricular ball.

If for special uses the travel of the balls is increased to the point where the travel-limiting grid is not sufficient to prevent the balls from leaving their mesh, a second grid can be provided, with twice the pitch.

The travel-limiting and/or guiding means are held spaced from the tray by any suitable means, for example by pins fixed or welded on the tray and carrying on ordinary washer or a washer specially designed to centre itself in a mesh of the grid or cloth.

The main advantages obtained by the invention are as follows:

(1) It ensures very fine division of the vapour and therefore very good mass exchange efficiency, since for example the orifices have a diameter of 3 to 6 mm. and the passages leave a clearance of about 3 mm. between the balls and the periphery of the passage.

(2) The tray can be constructed very easily, from conventional and inexpensive industrial products.

(3) As much operational flexibility can be obtained as is desired (that is to say a ratio between the maximum operating rate of flow and the minimum operating rate of flow) by choosing a suitable value for the ratio of the (a) surface area of the orifices and portions of the passages which are always open to (b) the total surface area of the openings.

(4) A very low pressure loss can be obtained by increasing the surface of the orifices.

(5) It is possible to combine these two qualities to have:

either less pressure loss than with a perforated plate with equal flexibility,
or more flexibility with equal pressure loss.

(6) The tray with balls is less sensitive to defects in flatness than a perforated tray, because of its greater flexibility in operation.

(7) There is point contact between the ball and the tray if the passage has a non-circular form, or linear ocntact in the case of a circular passage. This prevents the ball from sticking to the tray owing to deposits or owing to the effects of corrosion.

(8) Cleaning is easy since all the elements remain visible and accessible without disassembly.

(9) In the event of exceptional fouling, it is easy to dismantle all the elements.

(10) When the passages and ball become worn, play is automatically taken up and the closure element continues to function reliably.

The invention is applicable to all trays for mass exchange between immiscible phases of different specific gravity, particularly to distillation and absorption trays, and where appropriate, to phase division trays of liquid-liquid extraction columns with permanent or intermittent flow. In this latter application the balls may act as valves to limit the flow of the descending heavy phase to the orifices only, which increases speed, turbulence and exchange effectiveness, for example in cases where the heavy phase is small in quantity.

In order that the invention may more easily be understood, the following description is given by way of example.

In the drawings:

FIGURES 1 and 2 are plan views of parts of two different forms of trays according to the invention.

FIGURES 1a and 2a are corresponding sectional views on Ia–Ia and IIa–IIa of FIGURES 1 and 2, respectively.

FIGURES 3a and 3b, which are sectional views, show passages of nozzle-like form, the ball not being illustrated.

FIGURES 4, 5 and 6 are plan views of trays without the balls, showing various combinations of passages and orifices.

FIGURES 7, 8, 9 and 10 show various forms of grids and cloths which can be used as guiding and/or travel-limiting means.

Figure 11:
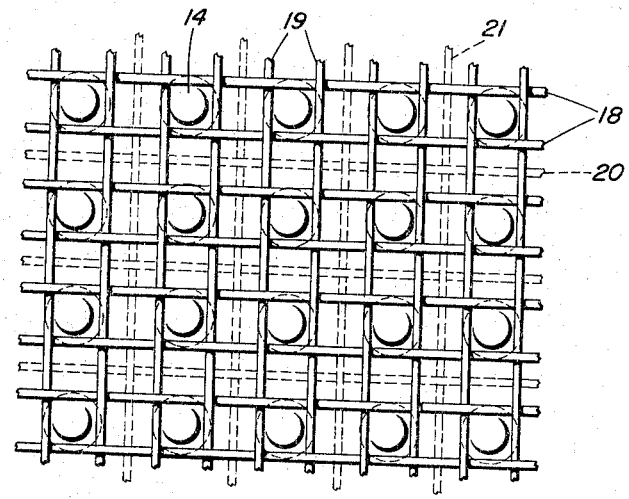

FIGURE 11 shows the use of a double grid.

Figure 11A:
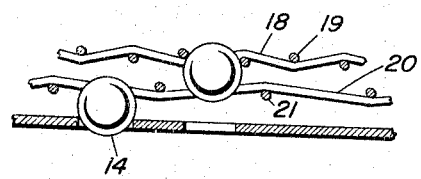

FIGURE 11a is a sectional view of the double grid embodiment of FIGURE 11.

Figure 12:
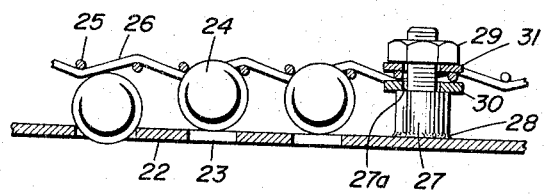

FIGURE 12 is a cross-section of a tray carrying balls and a retaining grid for the balls.

FIGURES 1 and 1a show one of the balls 1 closing a passage 2 which is a simple circular hole formed in the tray 3, while FIGURES 2 and 2a show a ball 4 resting at four points A, B, C, D on the edge of a square passage having rounded corners 5.

Instead of being simple holes, the passages may be in the form of divergent nozzles 6 (FIGURE 3a) or convergent nozzles 7 (FIGURE 3b).

FIGURES 4 to 6 show three examples of trays with circular passages 2 (FIGURE 4), square passages 5 (FIGURE 5) and four-lobe passages 8 (FIGURE 6). These passages may be regularly distributed and, as has been assumed in these examples, they may be arranged conjointly with orifices 9, 10, 11 which themselves are uniformly distributed; these orifices are illustrated as having a circular form but may be of any other shape. However, the orifices may not be necessary particularly when the passages have a non-circular configuration and thus ensure the ascent of a permanent flow of gas or vapour.

Figure 7:
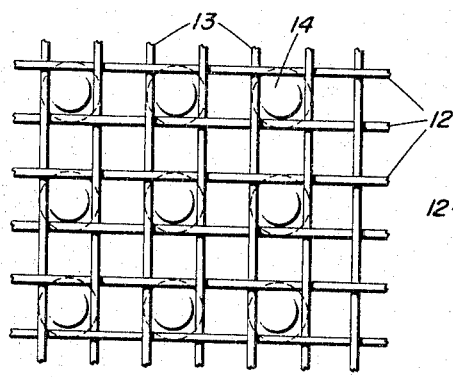

In order to limit the lifting of the balls while preventing them from being displaced laterally, there may be provided, as shown in FIGURE 7, a network of wires for example two sets of wires 12, 13 arranged at right angles to one another in the form of a grid having meshes smaller in size than the diameter of the balls 14; in this example, four meshes of the network are provided for each ball.

Figure 8:
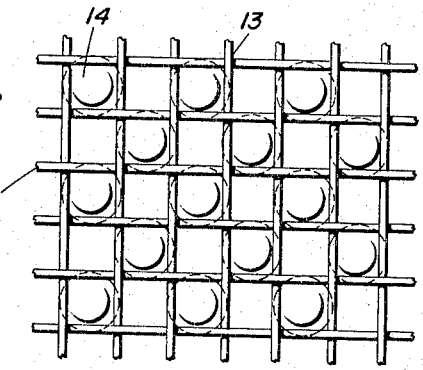

In the example shown in FIGURE 8, one ball 14 is provided for each two meshes.

Figure 9:
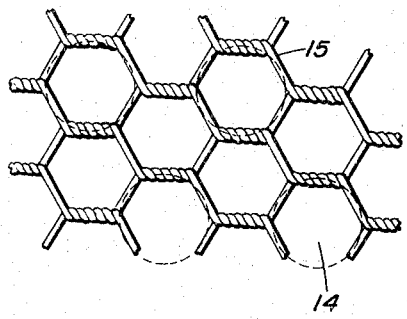

FIGURE 9 shows wires connected by twisting, forming a hexagonal-mesh grid 15.

Figure 10:
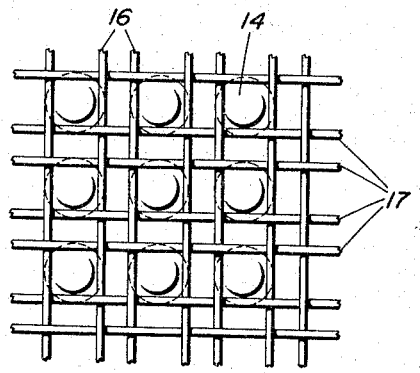

According to the example shown in FIGURE 10, the wires 16 and 17 are grouped to form a grid having unequal meshes.

FIGURES 11 and 11a show the association of a grid composed of rectangularly arranged wires 18, 19 with a second intermediate, lodger grid composed of wires 20, 21 which are also at right angles to one another. The sides of the squares formed by the second grid are twice the size of the sides of the squares of the grid formed by wires 18, 19. This second grid prevents the balls 14 from being displaced from the passage with which they are associated in the event of the first grid being sufficiently distant from the tray for the balls to be able to move laterally under the first grid without touching it.

An example of arranging a grid composed of wires 25, 26 above a tray 22 provided with passages 23 in association with balls 24 is illustrated in FIGURE 12. The tray comprises studs 27 welded at 28 to its upper face, the grid being gripped by a screw 29 between two washers 30, 31, one in contact with the shoulder 27a of the stud and the other in contact with the nut. Instead of a stud provided with a shoulder for retaining the washer 30 a tube may be provided which is fitted over a simple screwthreaded rod.

One of the washers, for example the washer 30, may have projecting from the face directed towards the other washer, a collar of appropriate diameter for centering in the mesh through which the stud extends.

The stud, fixed by resistance welding may comprise at its lower portion a centering boss engaging in a hole in the tray. In the case of non-ferrous metals the stud may, by way of a variant, be provided with a projection which is inserted in a hole in the tray and is rivetted at the other side.

I claim:

For use in an exchange column for improving contact between a lighter phase and a heavier phase, a tray having means defining a plurality of passages therein, said passages having an upper end, a plurality of balls normally spaced from each other with one at the upper end of each of said passages, each ball normally at least partially closing the upper end of the associated passage, said balls being capable of being lifted by upward flow of the lighter phase to fully open the associated passage, and wire grid means positioned above said tray and defining a travel limit for said balls, said wire grid means including a first wire grid positioned sufficiently above the tray to enable lateral movement of the balls under the first grid without touching the same, said first grid having meshes smaller in size than the diameter of said balls, said wire grid means further comprising a second grid having meshes larger in size than said balls, said second grid being disposed intermediate said first grid and said tray, said second grid being positioned above said tray a distance of less than the diameter of the balls.

References Cited

UNITED STATES PATENTS

| | | | |
|---|---|---|---|
| 942,666 | 12/1909 | Romstaedt | 137—513.5 X |
| 1,939,583 | 12/1933 | Welshausen | 261—114 |
| 3,022,720 | 2/1962 | Malz et al. | 137—533.11 X |
| 3,029,070 | 4/1962 | Koch | 261—114 |
| 3,122,594 | 2/1964 | Kielback | 261—94 |

FOREIGN PATENTS 485,050  10/1929  Germany.

HARRY B. THORNTON, *Primary Examiner.*

RONALD R. WEAVER, E. H. RENNER, *Examiners.*